(12) United States Patent
Wu

(10) Patent No.: US 9,794,381 B2
(45) Date of Patent: Oct. 17, 2017

(54) TERMINAL COVER BODY AND TERMINAL

(71) Applicant: ZTE Corporation, Shenzhen (CN)

(72) Inventor: Haoming Wu, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 0 days.

(21) Appl. No.: 15/029,895

(22) PCT Filed: Jun. 9, 2014

(86) PCT No.: PCT/CN2014/079514
§ 371 (c)(1),
(2) Date: May 17, 2016

(87) PCT Pub. No.: WO2014/180430
PCT Pub. Date: Nov. 13, 2014

(65) Prior Publication Data
US 2016/0269512 A1 Sep. 15, 2016

(30) Foreign Application Priority Data
Oct. 17, 2013 (CN) .......................... 2013 1 0487968

(51) Int. Cl.
H04B 1/034 (2006.01)
H04M 1/02 (2006.01)
(Continued)

(52) U.S. Cl.
CPC ........ *H04M 1/0249* (2013.01); *H04B 1/3888* (2013.01); *H04M 1/0202* (2013.01);
(Continued)

(58) Field of Classification Search
CPC .. H04M 1/0202; H04M 1/185; H04M 1/0262; H04M 1/0249; H04M 1/0274; H04B 1/3888
See application file for complete search history.

(56) References Cited

U.S. PATENT DOCUMENTS 8,345,422 B2   1/2013 Chen
8,390,255 B1*  3/2013 Fathollahi ............. H02J 7/0045
                                                    206/308.3
(Continued)

FOREIGN PATENT DOCUMENTS

CN    201781511 U  *  3/2011
CN    102376912 A     3/2012
(Continued)

OTHER PUBLICATIONS

International Search Report in international application No. PCT/CN2014/079514, mailed on Sep. 22, 2014.
(Continued)

*Primary Examiner* — Ankur Jain
*Assistant Examiner* — Max Mathew
(74) *Attorney, Agent, or Firm* — Oppedahl Patent Law Firm LLC

(57) ABSTRACT

The present invention embodiment provides a terminal cover body and a terminal, said terminal cover body being used for covering the device body of the terminal and encapsulating electronic components on the device body. The terminal cover body comprises: a casing body, wherein a slide-groove is provided in the casing body and a slide-block is provided in the slide groove; a lock engagement component which comes into contact with the slide-block; pushing the slide-block causes the lock engagement component to move between a first state and a second state, wherein, in the first state the lock engagement component is engaged with the device body and the casing body is tightly connected to the device body; in the second state, the lock engagement component is detached from the device body and the casing body can be separated from the device body.

9 Claims, 8 Drawing Sheets

(51) Int. Cl.
*H04B 1/3888* (2015.01)
*H04M 1/18* (2006.01)
(52) U.S. Cl.
CPC ........ *H04M 1/0274* (2013.01); *H04M 1/0262* (2013.01); *H04M 1/185* (2013.01)

(56) References Cited

U.S. PATENT DOCUMENTS

2001/0052599 A1* 12/2001 Ooishi .................... G11C 7/18
    257/63
2010/0110619 A1    5/2010 Feng
2012/0039025 A1    2/2012 Chen
2013/0104342 A1*  5/2013 Sano ................... H04M 1/0237
    16/297
2015/0194648 A1*  7/2015 Fathollahi ........... H01M 2/1061
    429/98
2016/0301542 A1* 10/2016 Davis .................... G08C 17/02

FOREIGN PATENT DOCUMENTS

| JP | H0795116 A | | 4/1995 |
|---|---|---|---|
| JP | 7095116 B | * | 10/1995 |
| JP | H08153911 A | | 6/1996 |
| JP | 2006115250 A | | 4/2006 |
| JP | 2012054193 A | | 3/2012 |

OTHER PUBLICATIONS

English Translation of the Written Opinion of the International Search Authority in international application No. PCT/CN2014/079514, mailed on Sep. 22, 2014.
Supplementary European Search Report in European application No. 14794473.0, mailed on Oct. 28, 2016.

* cited by examiner

TERMINAL COVER BODY AND TERMINAL

TECHNICAL FIELD

The disclosure relates to the field of electronic technologies, and in particular to a terminal cover body and a terminal.

BACKGROUND

In recent years, the popularization of mobile terminals brings infinite convenience and joy to people's life. Most of the mobile terminals like smart phone and tablet computer adopt a detachable battery as their power sources. When the battery, a Subscriber Identity Module (SIM) card or a memory card and the like is required to be replaced, it is needed to open the rear cover to take out the battery, the SIM card or the memory card and the like.

Most of the existing locking-engaging structures of the rear cover of the mobile terminal adopt a locking hook and an engaging structure to fix the rear cover on the device body; after the rear cover is installed, it is combined with the device body tightly and firmly; but it is difficult to disassemble, and if an excessive force is applied, the rear cover may be damaged, or even the mobile terminal may drop to the floor and become damaged.

SUMMARY

The disclosure provides a terminal cover body and a terminal, in which the terminal cover body can be detached from the terminal simply and conveniently.

The technical solutions of the disclosure are implemented as follows.

A terminal cover body is provided, which is used for covering a device body of the terminal and encapsulating electronic components in the device body; the terminal cover body includes:

a casing body, herein a slide slot is provided on the casing body, and a slide block is provided in the slide slot;

when the slide block is pushed, a lock unit which contacts with the slide block moves between a first state and a second state; herein, in the first state, the lock unit is engaged with the device body, and the casing body is tightly coupled with the device body; in the second state, the lock unit is detached from the device body, and the casing body is separated from the device body.

In an embodiment, a power-on circuit and a power-off circuit may also be provided on the casing body; before the lock unit moves to the first state, the slide block contacts with a power-on contact of the power-on circuit; before the lock unit moves to the second state, the slide block contacts with a power-off contact of the power-off circuit.

In an embodiment, the casing body may include a first casing and a second casing which are combined; an interlayer with an accommodation space is formed between the first casing and the second casing, the lock unit is provided in the interlayer, and the slide slot is provided on the first casing.

In an embodiment, the lock unit may include a first rod body and a second rod body which are set crosswise; the lock unit is fixed on the first casing and the second casing via a middle rotating shaft which is set at a junction of the first rod body and the second rod body.

In an embodiment, both ends of the first rod body and the second rod body may be provided with locking hooks, and the locking hooks are exposed to the interlayer via openings set at four corners of the second casing.

In an embodiment, a conductor may be provided at the bottom of the slide block; when the slide block moves to the first state after contacting with the power-on contact and switching on the power-on circuit, the slide block pushes the lock unit to be engaged with the device body; when the slide block moves to the second state after contacting with the power-off contact and switching on the power-off circuit, the slide block pushes the lock unit to be separated from the device body.

In an embodiment, both the power-on circuit and the power-off circuit may be provided on a side, facing the first casing, of the second casing; the power-on circuit includes a first circuit and a second circuit, the power-off circuit includes a third circuit and a fourth circuit, the power-on contact includes a first contact, which is set at the slide slot, of the first circuit and a second contact, which is set at the slide slot, of the second circuit, and the power-off contact includes a third contact, which is set at the slide slot of the third circuit and a fourth contact, which is set at the slide slot, of the fourth circuit.

In an embodiment, all of the first contact, the second contact, the third contact and the fourth contact may be physical-contact convex contacts, and the first contact and the second contact or the third contact and the fourth contact lock the slide block when the lock unit is in the first state or the second state, respectively.

A terminal is also provided, which includes the above terminal cover body.

The technical solutions of the disclosure have the following beneficial effects as follows.

By pushing the slide block in the slide slot on the casing body, the terminal cover body of the disclosure makes the lock unit move between a state of being engaged with the device body and a state of being detached from the device body to implement a tight connection or a separation between the casing body and the device body. The solutions make it convenient and simple to assemble and disassemble the terminal cover body, and will not damage the terminal cover body and the terminal.

DETAILED DESCRIPTION

Figure 1:
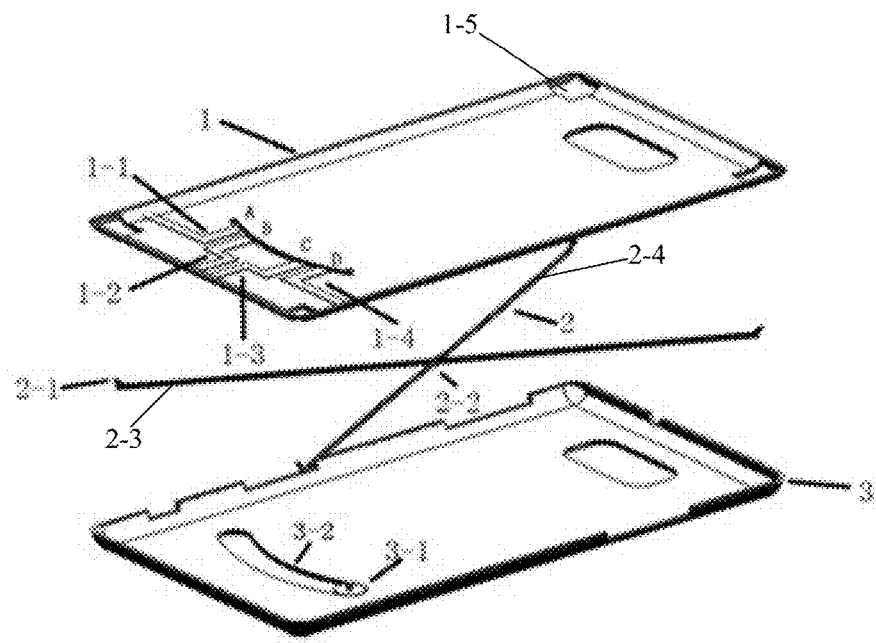
FIG. 1 is a structure decomposition diagram of a terminal cover body according to an embodiment of the disclosure.

For making the technical problems to be solved by the disclosure, the technical solutions and the advantages of the disclosure more clear, an elaboration is given below in combination with the accompanying drawings and specific embodiments.

The disclosure provides a terminal cover body, intended to solve the problems that most of the existing terminal cover bodies are fixed on the device body by using a locking hook and an engaging structure, after the rear cover is installed, the combination is tight and firm, but it is difficult to disassemble, and if an excessive force is applied, the rear cover may be damaged, even the mobile terminal may drop to be damaged.

The terminal cover body of the disclosure is used for covering the device body of a terminal and encapsulating electronic components in the device body; the terminal cover body includes:

a casing body, herein a slide slot is provided on the casing body, and a slide block is provided in the slide slot;

when the slide block is pushed, a lock unit which contacts with the slide block moves between a first state and a second state; herein, in the first state, the lock unit is engaged with the device body, and the casing body is tightly coupled with the device body; in the second state, the lock unit is detached from the device body, and the casing body is separated from the device body.

By pushing the slide block in the slide slot on the casing body, the terminal cover body makes the lock unit move between a state of being engaged with the device body and a state of being detached from the device body to implement a tight connection or a separation between the casing body and the device body. The solutions make it convenient and simple to assemble and disassemble the terminal cover body, and do not damage the terminal cover body and the terminal.

As well known, before the terminal cover body is disassembled, it is needed to first press a power button to power off the terminal, then disassemble the terminal cover body, and after the terminal cover body is assembled back, it is needed to press the power button to power on the terminal, the operation is relatively complex; so, for a terminal cover body according to another embodiment of the disclosure, on the basis of the above embodiment, a power-on circuit and a power-off circuit are also provided on the casing body, specifically, before the lock unit moves to the first state, the slide block contacts with a power-on contact of the power-on circuit; before the lock unit moves to the second state, the slide block contacts with a power-off contact of the power-off circuit.

In this way, before pushing the lock unit to assemble or disassemble the terminal cover body, the slide block switches on the power-on circuit or the power-off circuit set on the casing body by contacting with the power-on contact or the power-off contact, so as to power off while disassembling the terminal cover body and power on while assembling the terminal cover body; so it is possible to simplify the complex operations that it is needed to first press the power button to power off, then disassemble the terminal cover body, and after closing the terminal cover body, it is needed to press the power button to power on, thereby making the operations more convenient and efficient.

Signs in the accompanying drawings are described as follows:

1: second casing; 1-1: first circuit; 1-2: second circuit; 1-3: third circuit; 1-4: fourth circuit; 1-5: opening;

2: lock unit; 2-1: locking hook; 2-2: middle rotating shaft; 2-3: first rod body; 2-4: second rod body;

3: first casing; 3-1: slide block; 3-2: slide slot;

A: first contact; B: second contact: C: third contact: D: fourth contact.

As shown in FIG. 1, for a terminal cover body in another embodiment of the disclosure, on the basis of the above embodiment, a structure decomposition diagram of the terminal cover body is given. The casing body includes the first casing 3 and the second casing 1 which are combined; an interlayer with an accommodation space is formed between the first casing and the second casing, the lock unit 2 is provided in the interlayer, and the slide slot 3-2 is provided on the first casing 3. The slide block 3-1 is provided in the slide slot 3-2. The lock unit 2 includes the first rod body 2-3 and the second rod body 2-4 which are set crosswise; the lock unit 2 is fixed on the first casing 3 and the second casing 1 via the middle rotating shaft 2-2 which is set at a junction of the first rod body 2-3 and the second rod body 2-4. Both ends of the first rod body 2-3 and the second rod body 2-4 are provided with the locking hooks 2-1, and the locking hooks 2-1 are exposed to the interlayer via openings 1-5 set at four corners of the second casing 1. Both the power-on circuit and the power-off circuit are set on a side, facing the first casing 3, of the second casing 1; specifically, the power-on circuit includes the first circuit 1-1 and the second circuit 1-2, the power-off circuit includes the third circuit 1-3 and the fourth circuit 1-4, the power-on contact includes the first contact A, which is set at the slide slot 3-2, of the first circuit 1-1 and the second contact B, which is set at the slide slot 3-2, of the second circuit 1-2, and the power-off contact includes the third contact C, which is set at the slide slot 3-2 of the third circuit 1-3 and the fourth contact D, which is set at the slide slot 3-2, of the fourth circuit 1-4.

Figure 2:
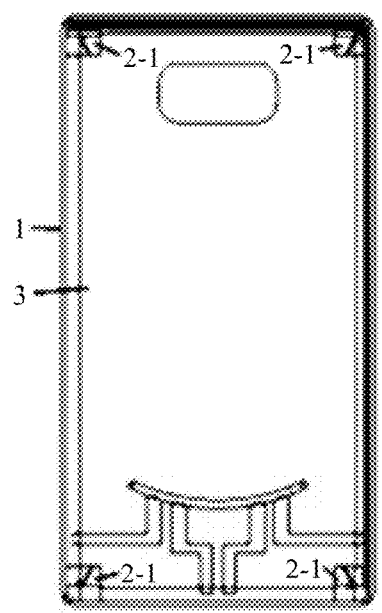
FIG. 2 is an inside view of a terminal cover body according to an embodiment of the disclosure (a diagram of circuit lines in the interlayer is a perspective view)
Figure 3:
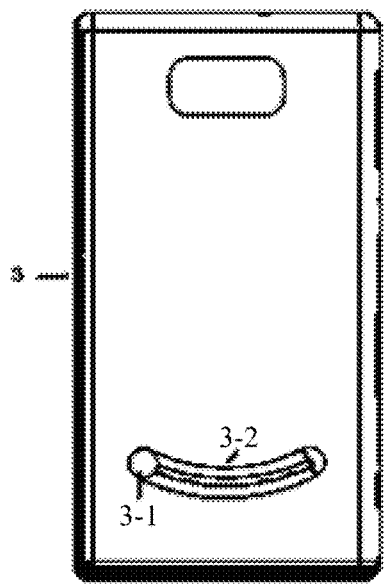
FIG. 3 is an exterior view of a terminal cover body according to an embodiment of the disclosure.

In combination with the description above, based on FIG. 1, a structure diagram of the terminal cover body according to an embodiment of the disclosure is also provided, which includes an inside view as shown in FIG. 2 and an exterior view as shown in FIG. 3. Herein, a diagram of circuits in the interlayer is a perspective view.

Figure 4:
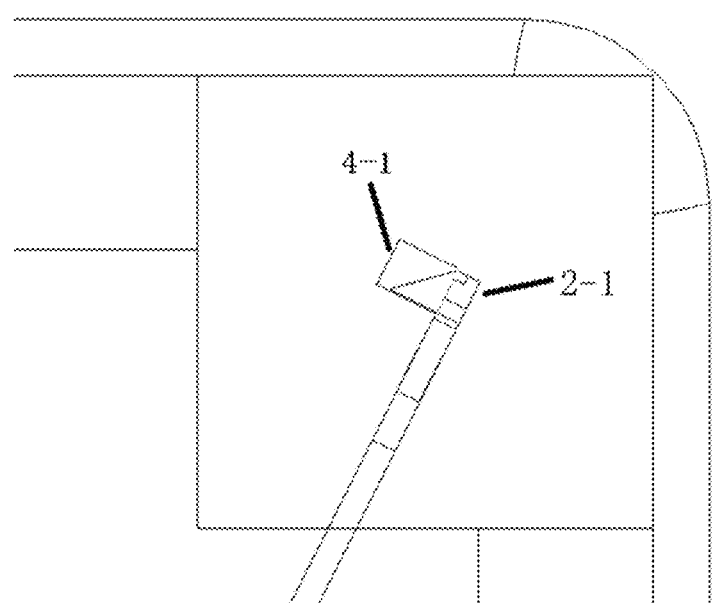
FIG. 4 is a perspective view of a combination between a locking hook of the terminal cover body and a restraint recess of the device body according to an embodiment of the disclosure.
Figure 5:
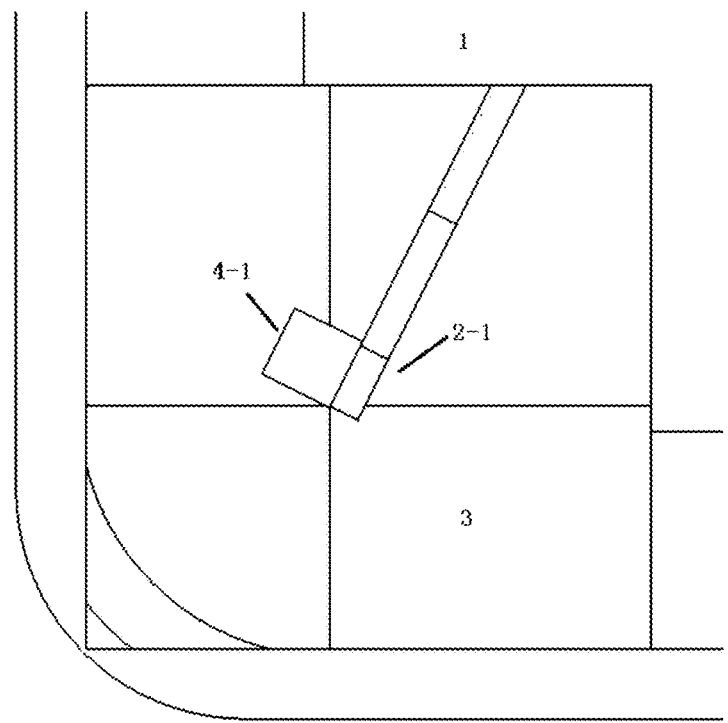
FIG. 5 is a schematic diagram of a combination effect between the locking hook of the terminal cover body and the restraint recess of the device body according to an embodiment of the disclosure.

The above is an overall structure representation of the terminal cover body according to an embodiment of the disclosure; for implementing the combination and separation between the terminal cover body and the device body, a single-opening restraint recess 4-1 is provided on the device body as shown in FIG. 4 and FIG. 5; after the terminal cover body is closed, the locking hook 2-1 enters in the single-opening restraint recess 4-1 on the device body, so that the terminal cover body and the device body are combined.

For a terminal cover body in another embodiment of the disclosure, on the basis of the above embodiment, a conductor is provided at the bottom of the slide block; when the slide block moves to the first state after contacting with the power-on contact and switching on the power-on circuit, it pushes the lock unit to be engaged with the device body; when the slide block moves to the second state after contacting with the power-off contact and switching on the power-off circuit, it pushes the lock unit to be separated from the device body. All of the first contact, the second contact, the third contact and the fourth contact are physical-contact convex contacts, and the first contact and the second contact or the third contact and the fourth contact lock the slide block when the lock unit is in the first state or the second state respectively.

Figure 6:
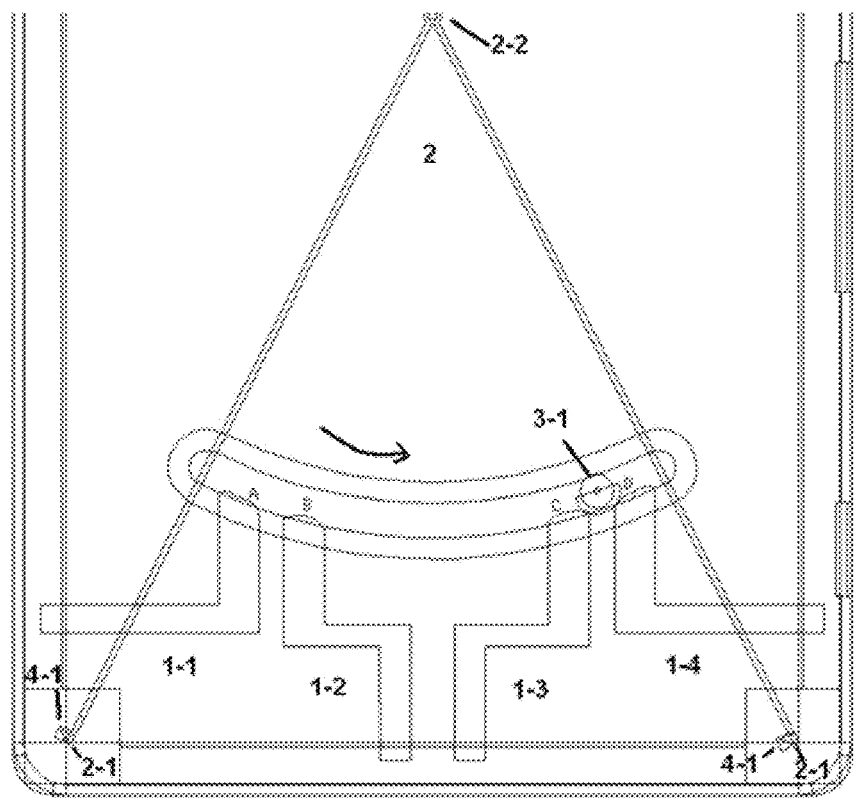
FIG. 6 is a schematic diagram (perspective view) of triggering a power-off circuit of the terminal cover body according to an embodiment of the disclosure.
Figure 7:
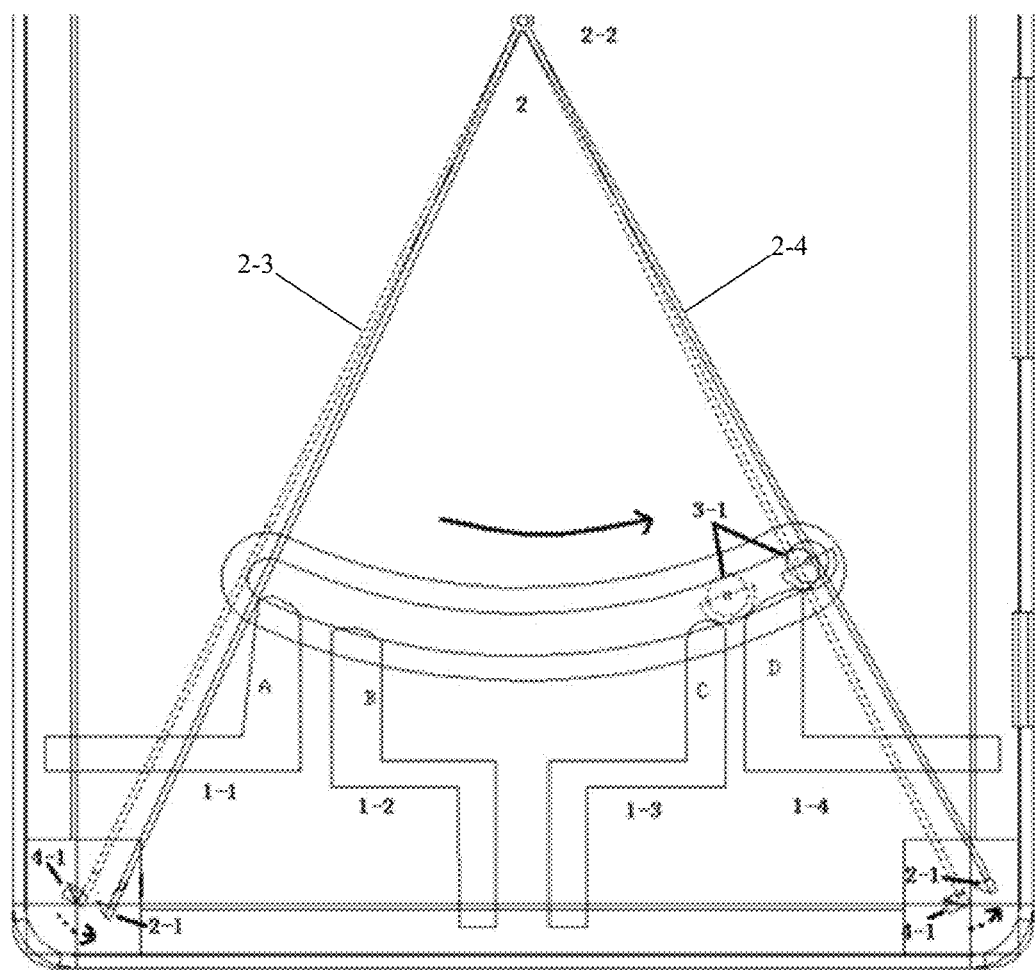
FIG. 7 is a schematic diagram (perspective view) of a process of separating the locking hook of the lock unit of the terminal cover body from the restraint recess of the device body (opening the cover) according to an embodiment of the disclosure.
Figure 8:
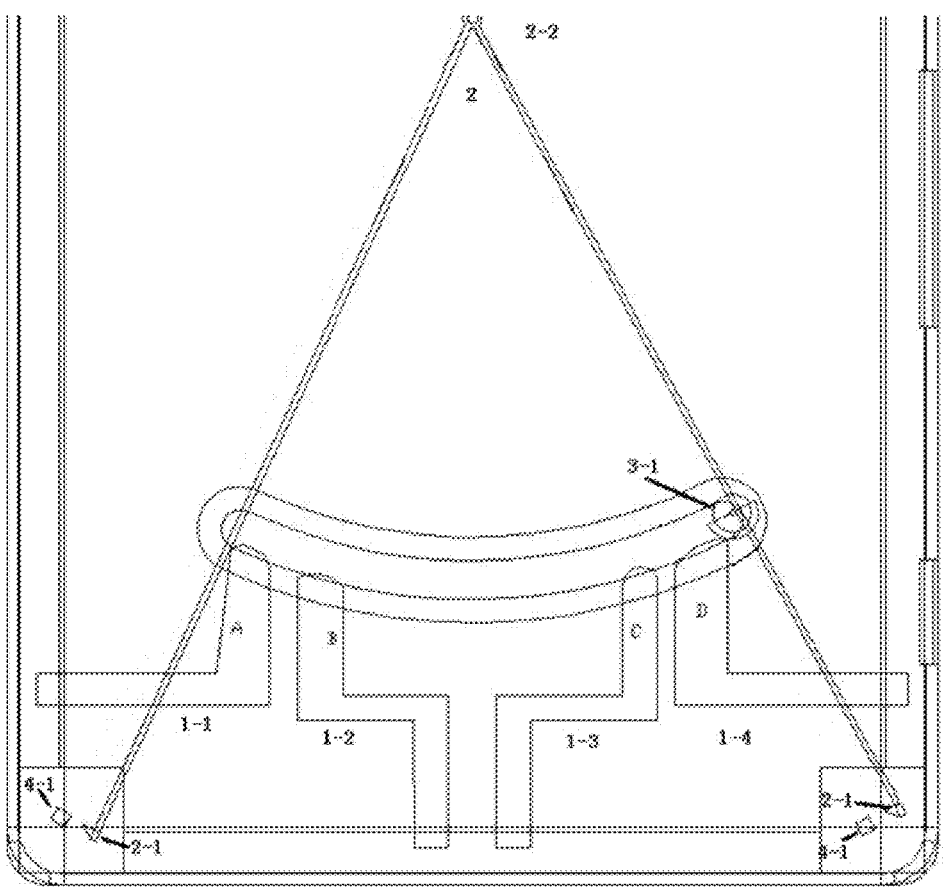
FIG. 8 is a schematic diagram (perspective view) of a state of the terminal cover body after being opened according to an embodiment of the disclosure.

As shown in FIG. 6, when the terminal cover body is about to be opened, the slide block 3-1 is slid in the arc-shaped slide slot along the direction of arrow in the figure; because the bottom of the slide block 3-1 is the conductor, when it contacts with the third contact C and the fourth contact D, the power-off circuit is switched on, the system executes a power-off command to enter a power-off state; the slide block 3-1 is slid continuously along the direction of arrow in the figure, as shown in FIG. 7, the slide block 3-1 is detached from the third contact C and the fourth contact D, the slide block 3-1 contacts and pushes the lock unit 2 to move, the locking hooks 2-1 of the first rod body 2-3 and the second rod body 2-4 of the lock unit 2 are detached from the restraint recess 4-1, and the terminal cover body is separated from the device body, at this point, the right end of the slide block 3-1 contacts with the lock unit 2, and the left end contacts with the fourth contact D; because of the convex fourth contact D, the slide block 3-1 does not move in the absence of external force, and the lock unit 2 contacting with it does not move neither, as shown in FIG. 8.

Figure 9:
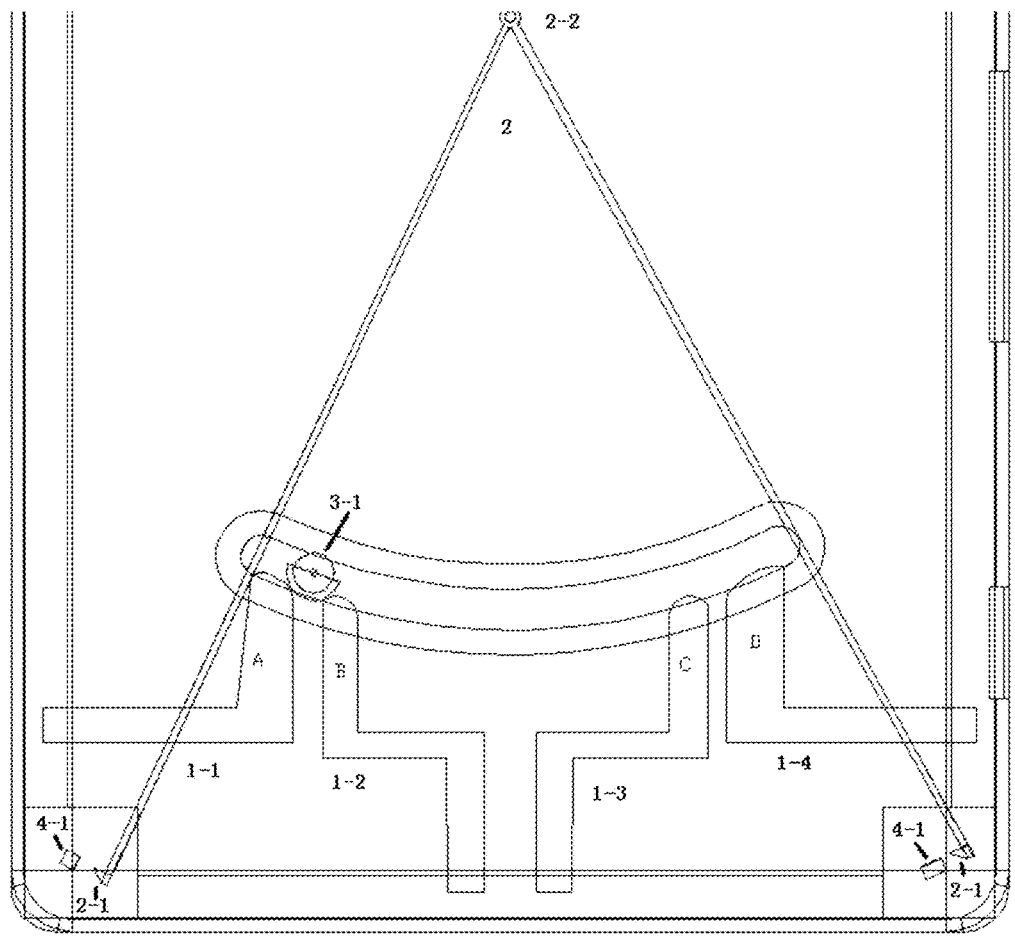
FIG. 9 is a schematic diagram (perspective view) of triggering a power-on circuit of the terminal cover body according to an embodiment of the disclosure.
Figure 10:
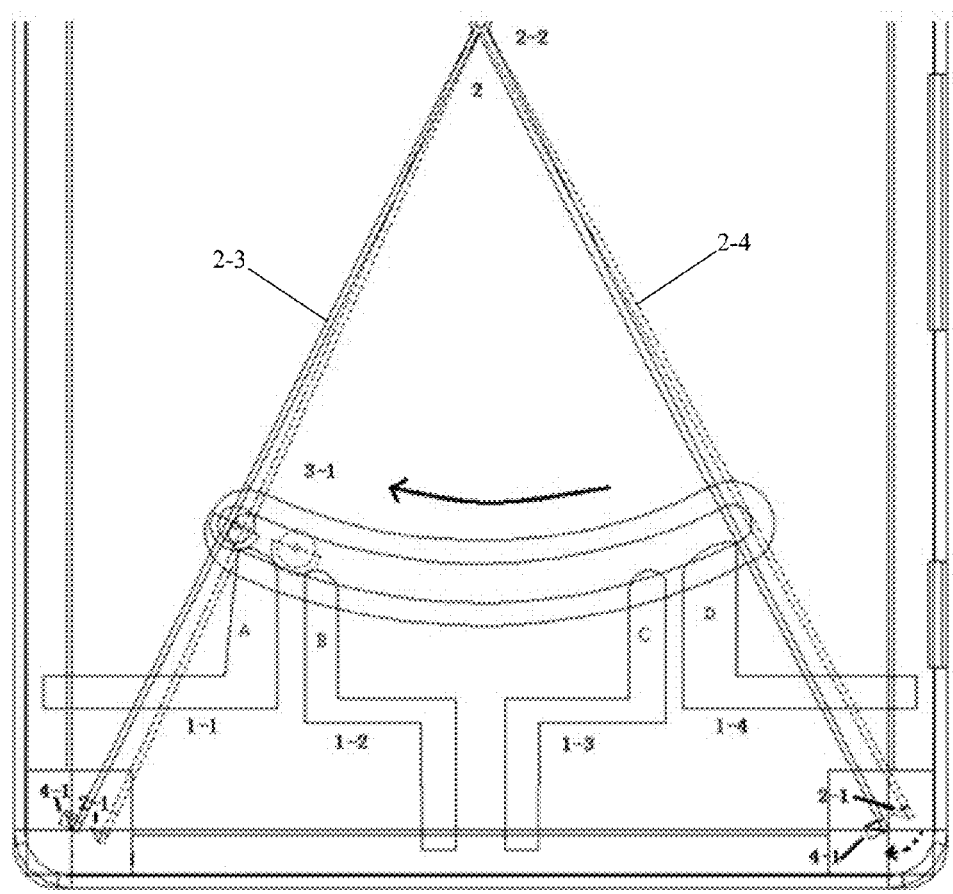
FIG. 10 is a schematic diagram (perspective view) of a process of pushing the locking hook of the lock unit of the terminal cover body into the restraint recess of the device body (closing the cover) according to an embodiment of the disclosure.
Figure 11:
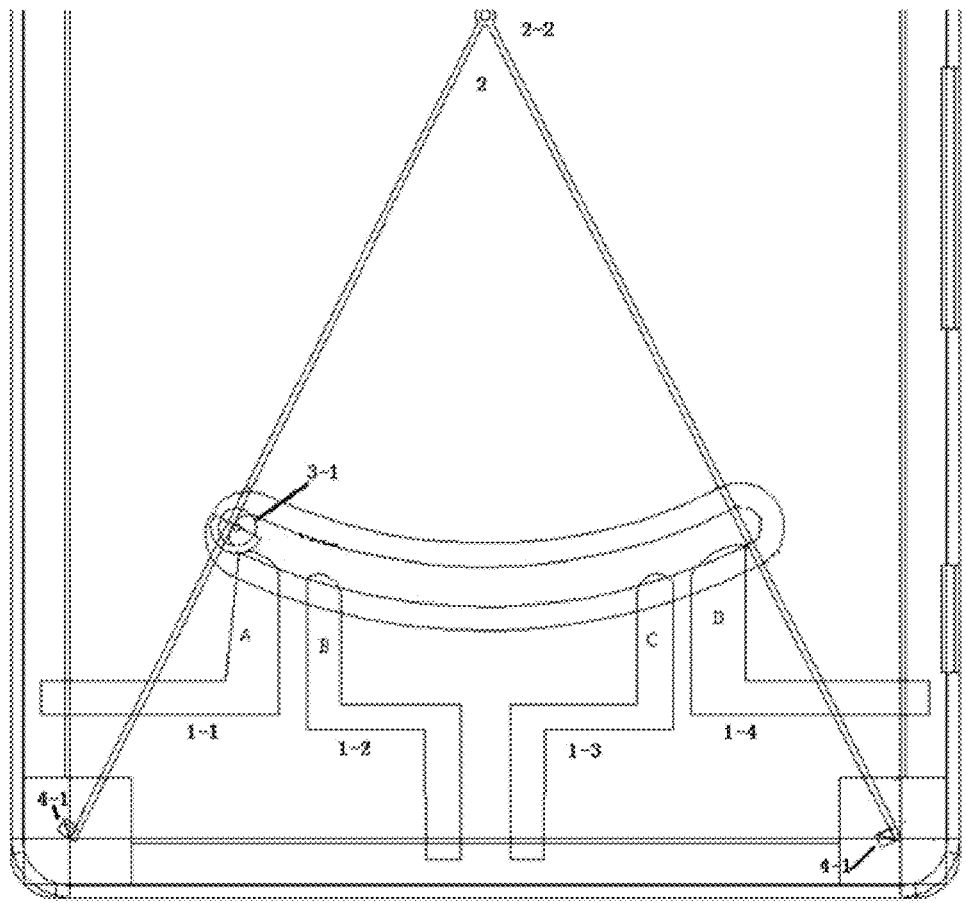
FIG. 11 is a schematic diagram (perspective view) of a state of the terminal cover body after being closed according to an embodiment of the disclosure.

Similarly, when the terminal cover body is installed, as shown in FIG. 9, after the terminal cover body is placed on the device body, the slide block 3-1 is slid in the reverse direction to contact with the first contact A and the second contact B, then the power-on circuit is switched on, the system executes a power-on command and starts to power on; the slide block 3-1 is slid continuously, as shown in FIG. 10, then the slide block 3-1 is detached from the first contact A and the second contact, the slide block 3-1 contacts and pushes lock unit 2 to move; the locking hooks 2-1 of the first rod body 2-3 and the second rod body 2-4 of the lock unit 2 are pushed in the restraint recess 4-1, and the terminal cover body and the device body are combined, at this point, the left end of the slide block 3-1 contacts with the lock unit 2, and the right end contacts with the first contact A; because of the convex first contact A, the slide block 3-1 does not move in the absence of external force, as shown in FIG. 11, and the lock unit 2 contacting with it does not move neither, thus it is not possible for the lock unit 2 to be separated from the restraint recess 4-1.

Figure 12:
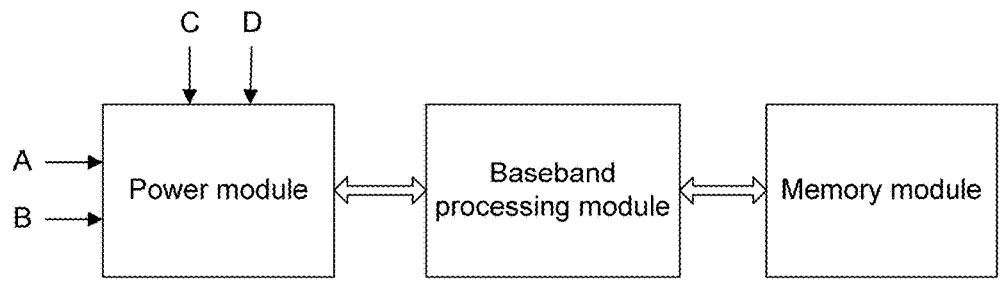
FIG. 12 is a schematic diagram of the power-on circuit and the power-off circuit of the terminal cover body according to an embodiment of the disclosure.

As an example, a schematic diagram of the power-on circuit and the power-off circuit are shown in FIG. 12; an electronic device shown in FIG. 12 includes a power module, a baseband processing module and a memory module; specifically, the first contact A is connected with the power module via the first circuit, the second contact B is connected with the power module via the second circuit, the third contact C is connected with the power module via the third circuit, and the fourth contact D is connected with the power module via the fourth circuit.

Certainly, the four contacts of the terminal cover body of the disclosure are physical-contact convex contacts for example, but they can also be induction-type contact for conduction of circuits, or in other forms, all of which need not be detailed here.

The disclosure also provides a terminal which includes the above terminal cover body.

Note that, the terminal includes the above terminal cover body, and the implementation of the above terminal cover body is applicable to the embodiments of the terminal, and can achieve the same technical effects.

The technical solutions of the disclosure have the following beneficial effects as follows.

By pushing the slide block in the slide slot on the casing body, the terminal cover body of the disclosure makes the lock unit move between the state of being engaged with the device body and the state of being detached from the device body to implement the tight connection or the separation between the casing body and the device body. The solutions make it convenient and simple to assemble and disassemble the terminal cover body, and do not damage the terminal cover body and the terminal.

For the terminal cover body of the disclosure, the power-on circuit and the power-off circuit are also provided on the casing body; before pushing the lock unit to assemble and disassemble the terminal cover body, the slide block switches on the power-on circuit or the power-off circuit set on the casing body by contacting with the power-on contact or the power-off contact, so as to power off while disassembling the terminal cover body and power on while assembling the terminal cover body; so it is possible to simplify the complex operations that it is needed to first press the power button to power off, then disassemble the terminal cover body, and after closing the terminal cover body, it is needed to press the power button to power, thereby making the operations more convenient and efficient.

The above is only the preferred implementation of the disclosure; it should be indicated that, on the premise of not departing from the principles of the disclosure, those ordinary skill in the art may also make a number of improvements and supplements and these improvements and supplements should fall within the scope of the claims of the disclosure.

What is claimed is:

1. A terminal cover body, which is used for covering a device body of a terminal and encapsulating electronic components in the device body, comprising:
  a casing body, wherein a slide slot is provided on the casing body, and a slide block is provided in the slide slot;
  when the slide block is pushed, a lock unit which contacts with the slide block moves between a first state and a second state; wherein in the first state, the lock unit is engaged with the device body, and the casing body is tightly coupled with the device body; in the second state, the lock unit is detached from the device body, and the casing body is separated from the device body,
  wherein the casing body comprises a first casing and a second casing which are combined; an interlayer with an accommodation space is formed between the first casing and the second casing, the lock unit is provided in the interlayer, and the slide slot is provided on the first casing,
  wherein the lock unit comprises a first rod body and a second rod body which are set crosswise; the lock unit is fixed on the first casing and the second casing via a middle rotating shaft which is set at a junction of the first rod body and the second rod body.

2. The terminal cover body according to claim 1, wherein a power-on circuit and a power-off circuit are also provided on the casing body; before the lock unit moves to the first state, the slide block contacts with a power-on contact of the power-on circuit; before the lock unit moves to the second state, the slide block contacts with a power-off contact of the power-off circuit.

3. The terminal cover body according to claim 1, wherein both ends of the first rod body and the second rod body are provided with locking hooks, and the locking hooks are exposed to the interlayer via openings set at four corners of the second casing.

4. The terminal cover body according to claim 2, wherein a conductor is provided at the bottom of the slide block; when the slide block moves to the first state after contacting with the power-on contact and switching on the power-on circuit, the slide block pushes the lock unit to be engaged with the device body; when the slide block moves to the second state after contacting with the power-off contact and switching on the power-off circuit, the slide block pushes the lock unit to be separated from the device body.

5. The terminal cover body according to claim 2, wherein both the power-on circuit and the power-off circuit are provided on a side, facing the first casing, of the second casing; the power-on circuit comprises a first circuit and a second circuit, the power-off circuit comprises a third circuit and a fourth circuit, the power-on contact comprises a first contact, which is set at the slide slot, of the first circuit and a second contact, which is set at the slide slot, of the second circuit, and the power-off contact comprises a third contact, which is set at the slide slot of the third circuit and a fourth contact, which is set at the slide slot, of the fourth circuit.

6. The terminal cover body according to claim 5, wherein all of the first contact, the second contact, the third contact and the fourth contact are physical-contact convex contacts, and the first contact and the second contact or the third contact and the fourth contact lock the slide block when the lock unit is in the first state or the second state, respectively.

7. A terminal, comprising a terminal cover body, which is used for covering a device body of a terminal and encapsulating electronic components in the device body, comprising:
 a casing body, wherein a slide slot is provided on the casing body, and a slide block is provided in the slide slot;
 when the slide block is pushed, a lock unit which contacts with the slide block moves between a first state and a second state; wherein in the first state, the lock unit is engaged with the device body, and the casing body is tightly coupled with the device body; in the second state, the lock unit is detached from the device body, and the casing body is separated from the device body,
 wherein the casing body comprises a first casing and a second casing which are combined; an interlayer with an accommodation space is formed between the first casing and the second casing, the lock unit is provided in the interlayer, and the slide slot is provided on the first casing,
 wherein the lock unit comprises a first rod body and a second rod body which are set crosswise; the lock unit is fixed on the first casing and the second casing via a middle rotating shaft which is set at a junction of the first rod body and the second rod body.

8. The terminal cover body according to claim 4, wherein both the power-on circuit and the power-off circuit are provided on a side, facing the first casing, of the second casing; the power-on circuit comprises a first circuit and a second circuit, the power-off circuit comprises a third circuit and a fourth circuit, the power-on contact comprises a first contact, which is set at the slide slot, of the first circuit and a second contact, which is set at the slide slot, of the second circuit, and the power-off contact comprises a third contact, which is set at the slide slot of the third circuit and a fourth contact, which is set at the slide slot, of the fourth circuit.

9. The terminal cover body according to claim 8, wherein all of the first contact, the second contact, the third contact and the fourth contact are physical-contact convex contacts, and the first contact and the second contact or the third contact and the fourth contact lock the slide block when the lock unit is in the first state or the second state, respectively.

* * * * *